United States Patent
Li (10) Patent No.: US 10,796,379 B2
(45) Date of Patent: Oct. 6, 2020

(54) HANDING REQUESTS IN A CONSENSUS NETWORK

(71) Applicant: Alibaba Group Holding Limited, George Town (KY)

(72) Inventor: Ning Li, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 319 days.

(21) Appl. No.: 15/900,647

(22) Filed: Feb. 20, 2018

(65) Prior Publication Data
US 2018/0260909 A1 Sep. 13, 2018

(30) Foreign Application Priority Data

Mar. 8, 2017 (CN) .......................... 2017 1 0133969

(51) Int. Cl.
*G06Q 40/00* (2012.01)
*G06Q 20/38* (2012.01)
(Continued)

(52) U.S. Cl.
CPC .......... *G06Q 40/12* (2013.12); *G06F 21/602* (2013.01); *G06Q 10/067* (2013.01);
(Continued)

(58) Field of Classification Search
CPC ........ G06Q 20/02; G06Q 20/20; G06Q 20/40; G06Q 20/06; G06Q 40/12; G06Q 40/04;
(Continued)

(56) References Cited

U.S. PATENT DOCUMENTS

| 70,244,761 | 8/2017 | Baukes et al. |
| 2008/0065648 A1 | 3/2008 | Gupta et al. |

(Continued)

FOREIGN PATENT DOCUMENTS

| AU | 2018231022 | 9/2018 |
| CN | 105427104 | 3/2016 |

(Continued)

OTHER PUBLICATIONS cnblogs.com [online], "Distributed Consistency Algorithm-Paxos," Jun. 2016, retrieved on Aug. 13, 2019, retrieved from URL<https://www.cnblogs.com/cchust/p/5617989.html>, 16 pages (with machine translation).

(Continued)

*Primary Examiner* — Olusegun Goyea
(74) *Attorney, Agent, or Firm* — Fish & Richardson P.C.

(57) ABSTRACT

The present disclosure describes techniques for using a consensus network for handling requests. In one implementation, a first block chain node sends, to a consensus network, a business request generated according to business information sent by a user. A second block chain node in the consensus network verifies the legality of a business result obtained by a third block chain node according to the business request. The first block chain node executes a first designated operation by triggering a first smart contract in the business request. The first block chain node utilizes the smart contract executed automatically. The first block chain node automatically accomplishes the first designated operation by using the first smart contract once the business result passes the verification carried out by the second block chain node. The second block chain node verifies the business result obtained by the third block chain node.

19 Claims, 3 Drawing Sheets

(51) Int. Cl.
*G06Q 10/06* (2012.01)
*G06Q 50/18* (2012.01)
*G06Q 20/40* (2012.01)
*G06F 21/60* (2013.01)
*H04L 9/06* (2006.01)

(52) U.S. Cl.
CPC ....... *G06Q 20/389* (2013.01); *G06Q 20/3827* (2013.01); *G06Q 20/3829* (2013.01); *G06Q 20/38215* (2013.01); *G06Q 20/4016* (2013.01); *G06Q 50/188* (2013.01); *H04L 9/0637* (2013.01); *G06Q 2220/00* (2013.01)

(58) Field of Classification Search
CPC ........ G06Q 30/06; G06Q 50/06; G06Q 20/38; G06Q 20/08; H04L 29/06; H04L 9/32
USPC .................................. 705/66, 69, 64, 71, 58
See application file for complete search history.

(56) References Cited

U.S. PATENT DOCUMENTS

| | | | |
|---|---|---|---|
| 2009/0012804 A1 | 1/2009 | Read | |
| 2015/0379510 A1* | 12/2015 | Smith | H04L 9/3242 705/71 |
| 2016/0092988 A1* | 3/2016 | Letourneau | G06Q 20/363 705/66 |
| 2016/0140653 A1* | 5/2016 | McKenzie | G06Q 20/3678 705/69 |
| 2016/0203448 A1* | 7/2016 | Metnick | H04L 9/3247 705/64 |
| 2016/0203572 A1* | 7/2016 | McConaghy | G06Q 20/10 705/58 |
| 2016/0224949 A1* | 8/2016 | Thomas | G06Q 20/027 |
| 2016/0224977 A1* | 8/2016 | Sabba | G06Q 20/385 |
| 2016/0260171 A1* | 9/2016 | Ford | G06Q 40/04 |
| 2016/0261690 A1* | 9/2016 | Ford | H04L 9/3239 |
| 2016/0283920 A1 | 9/2016 | Fisher et al. | |
| 2016/0323109 A1* | 11/2016 | McCoy | G06Q 20/065 |
| 2016/0330034 A1* | 11/2016 | Back | G06Q 20/065 |
| 2016/0335533 A1* | 11/2016 | Davis | G06F 9/44 |
| 2016/0342977 A1* | 11/2016 | Lam | G06Q 20/0658 |
| 2016/0344737 A1* | 11/2016 | Anton | G06F 21/6218 |
| 2016/0358135 A1* | 12/2016 | Liao | G06Q 20/0655 |
| 2016/0358161 A1* | 12/2016 | Cobban | G06Q 30/0201 |
| 2016/0358253 A1* | 12/2016 | Liao | G06Q 40/04 |
| 2017/0048209 A1 | 2/2017 | Lohe et al. | |
| 2017/0103468 A1* | 4/2017 | Orsini | G07F 15/003 |
| 2017/0124556 A1 | 5/2017 | Seger, II | |
| 2017/0344987 A1* | 11/2017 | Davis | G06F 16/9535 |
| 2017/0366451 A1 | 12/2017 | Schreter | |
| 2018/0145836 A1* | 5/2018 | Saur | G06Q 20/3829 |
| 2018/0204260 A1* | 7/2018 | McGregor | G06Q 30/0609 |
| 2018/0240114 A1 | 8/2018 | Li | |
| 2018/0299852 A1* | 10/2018 | Orsini | G06Q 50/06 |

FOREIGN PATENT DOCUMENTS

| | | |
|---|---|---|
| CN | 105630609 | 6/2016 |
| CN | 105808325 | 7/2016 |
| CN | 105809062 | 7/2016 |
| CN | 106204287 | 12/2016 |
| CN | 106228446 | 12/2016 |
| CN | 106327173 | 1/2017 |
| CN | 106357604 | 1/2017 |
| CN | 107040585 | 8/2017 |
| CN | 107391526 | 11/2017 |
| EP | 3563318 | 11/2019 |
| JP | 2001266039 | 9/2001 |
| JP | 200779645 | 3/2007 |
| JP | 2018533103 | 11/2018 |
| RU | 2485590 | 6/2013 |
| RU | 2639015 | 12/2017 |
| TW | 561381 | 11/2003 |
| TW | 201627889 | 8/2016 |
| WO | WO 2017010455 | 1/2017 |
| WO | WO 2017011601 | 1/2017 |
| WO | WO 2017024071 | 1/2017 |
| WO | WO 2018031551 | 2/2018 |
| WO | WO 2018165104 | 9/2018 |

OTHER PUBLICATIONS yiyibooks.cn [online], "Bitcoin Developer Guide," Apr. 2014, retrieved on Aug. 13, 2019, retrieved from URL<https://www.yiyibooks.cn/Gamma/bitcoin/developer-guide.html>, 123 pages (with machine translation).

Bitcoin Wiki [online], "Protocol Documentation," Sep. 2016, [retrieved from Mar. 28, 2018], retrieved from: URL<https://en.bitcoin.it/w/index.php?title=Protocol_documentation&oldid=61587>, 24 pages.

Bitcoin Wiki [online], "Protocol Rules," Oct. 2016, [retrieved from Mar. 28, 2018], retrieved from: URL<https://en.bitcoin.it/w/index.php?title=Protocol_rules&oldid=61687>, 6 pages.

International Search Report and Written Opinion in International Application No. PCT/US2018/019228, dated Apr. 12, 2018, 18 pages.

International Search Report and Written Opinion in International Application No. PCT/US2018/021064, dated May 4, 2018, 13 pages.

Medium.com [online], "How Does the Blockchain Work?," Jun. 2016, [retrieved from on Mar. 28, 2018], retrieved from: URL<https://medium.com/@micheledaliessi/how-does-the-blockchain-work-98c8cd01d2ae>, 18 pages.

Second Written Opinion in International Application No. PCT/US2018/019228, dated Jan. 31, 2018, 12 pages.

D'Aliessi, onezero.medium.com [online], "How Does the Blockchain Work?", Jun. 1, 2016, retrieved on Nov. 15, 2019, retrieved from URL <https://onezero.medium.com/how-does-the-blockchain-work-98c8cd01d2ae>, 18 pages.

PCT International Preliminary Report on Patentability in International Application No. PCT/US2018/021064, dated Sep. 19, 2019, 8 pages.

International Preliminary Report on Patentability Ch. II in International Application No. PCT/US2018/019228, dated May 23, 2019, 25 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Christidis et al., "Blockchains and Smart Contracts for the Internet of Things," IEEE Access Special Section on the Plethora of Research in Internet of Things (IoT), May 2016, 4:2292-2303.

\* cited by examiner

HANDING REQUESTS IN A CONSENSUS NETWORK

This application claims priority to Chinese Patent Application No. 201710133969.X, filed on Mar. 8, 2017, which is incorporated by reference in its entirety. The subject matter of the present invention is also related to U.S. patent application Ser. No. 15/900,617, filed on Feb. 20, 2018, which is incorporated by reference in its entirety.

BACKGROUND

Users entrust transaction handling organizations to handle transactions for them. For example, transaction handling organizations can provide professional business handling services for the users. The handling services can facilitate completion of relatively complex and tedious transaction processing procedures for the users. For example, to process a transaction through the transaction handling organization, a user can send a request to the transaction handling organization through a terminal. The transaction handling organization can obtain a corresponding result according to the request sent by the user and return the result to the user.

However, some transaction handling organizations may have faulty processes for handling transactions and may return incorrect results that have damaging effects on users. By taking asset appraisal as an example, a user can send a request for an asset appraisal to an asset appraisal organization. The asset appraisal organization may provide a false asset appraisal report that is returned to the user. The false report may prevent the user from subsequently carrying out a transfer of a property right, insurance loss compensation, or other asset settlement, which can cause a loss to the user. However, the use of a reliable trust mechanism between the user and the assent appraisal organization can help to protect the user from such losses.

SUMMARY

The present disclosure describes techniques for using a consensus network for handling requests.

The subject matter described in this specification can be implemented in particular implementations, so as to realize one or more of the following advantages. First, a first block chain node can utilize a smart contract that can be executed automatically. For example, the first block chain node can execute a first designated operation by triggering the first smart contract once a business result obtained by a third block chain node according to a business request sent by the first block chain node passes verification carried out by a second block chain node. Second, because the second block chain node can verify the business result obtained by the third block chain node, the business processing procedure can be provided with a system of impartiality, thus greatly improving the impartiality of business processing and reducing the possibility that a user suffers losses during business processing.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes techniques for using a consensus network for handling requests, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In order to facilitate effective impartiality in a process in which a user carries out processing through a transaction handling organization, a trust mechanism can be established between the user and the transaction handling organization by using a consensus network of block chains. The processing can include, for example, processing of business transactions, and the transaction handling organization can be a business transaction handling organization. In some implementations, by using a tamper-resistant characteristic of data stored in the block chains of the consensus network, a request (for example, a business request) sent by the user and a result (for example, a business result) obtained by the transaction handling organization according to the request can both have effective impartiality. Moreover, to further improve impartiality during processing, an audit mechanism can be introduced as a block chain node to verify the request sent by the user and the result obtained by the transaction handling organization. After the verification succeeds, a smart contract can be triggered by a signature to automatically execute a designated operation, facilitating implementation of a process for automatically completing processing without manual intervention.

Figure 1:
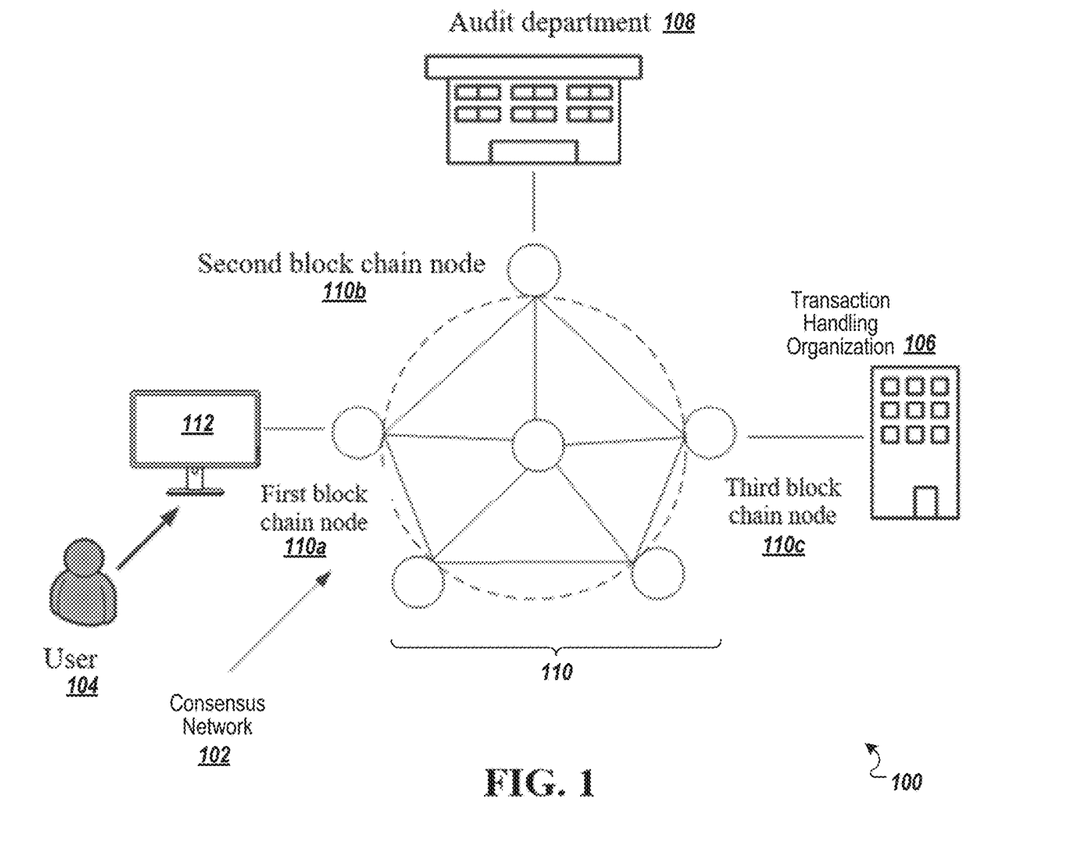
FIG. 1 is a block diagram of an example of a system for implementing transactions within a consensus network, according to an implementation of the present disclosure.

FIG. 1 is a block diagram of an example of a system 100 for implementing transactions within a consensus network 102, according to an implementation of the present disclosure. FIG. 1 shows relationships among a user 104, a transaction handling organization 106, an audit department 108, and the consensus network 102.

The consensus network 102 includes multiple block chain nodes 110. A terminal 112 (from which the user 104 sends a request), the transaction handling organization 106, and the audit department 108 can each serve as block chain nodes 110 in the consensus network 102. The user 104 can send a request (for example, a business request) to the consensus network 102 by using the terminal 112 that serves as a first block chain node 110a. After the request enters the consensus network 102, the transaction handling organization 106, serving as a third block chain node 110c, can accept the request and provide a corresponding result (for example, a business result). Thereafter, the audit department 108, serving as a second block chain node 110b, can verify the result obtained by the third block chain node 110c. After it is determined that the result passes the verification, the audit department 108 can trigger, using a signature, the first block chain node 110a to execute a first designated operation by using a smart contract. The smart contract is a digital representation of a set of promises, including protocols within which the parties perform on these promises. In some implementations, the smart contract represents a promise by a party (for example, the first block chain node 110a) to perform an operation upon the occurrence of a trigger event (for example, the audit department providing its signature upon verifying the result). The operation can be, for example, an operation to transfer a certain amount of money from an account of the user 104 to the transaction handling organization 106. The result obtained by the transaction handling organization 106 and the request sent by the user 104 can be stored in a block chain in the form of an information abstract. The stored information can create a basis for subsequent authentication on whether the result and the request have been modified.

The request sent by the user 104 to the consensus network 102 can include a first smart contract. The first block chain node 110a can use the first smart contract to automatically execute the first designated operation upon verification, by the audit department 108 serving as the second block chain node 110b, of the result obtained by the third block chain node 110c according to the request. Verification can include determining, for example, that the result is correct and legal.

Result information generated by the third block chain node 110c, according to the result, can include a second smart contract. Using the second smart contract, the third block chain node 110c can execute a second designated operation by automatically triggering the smart contract once the second block chain node 110b verifies, as illegal, the result obtained by the third block chain node 110c according to the request.

Figure 2:
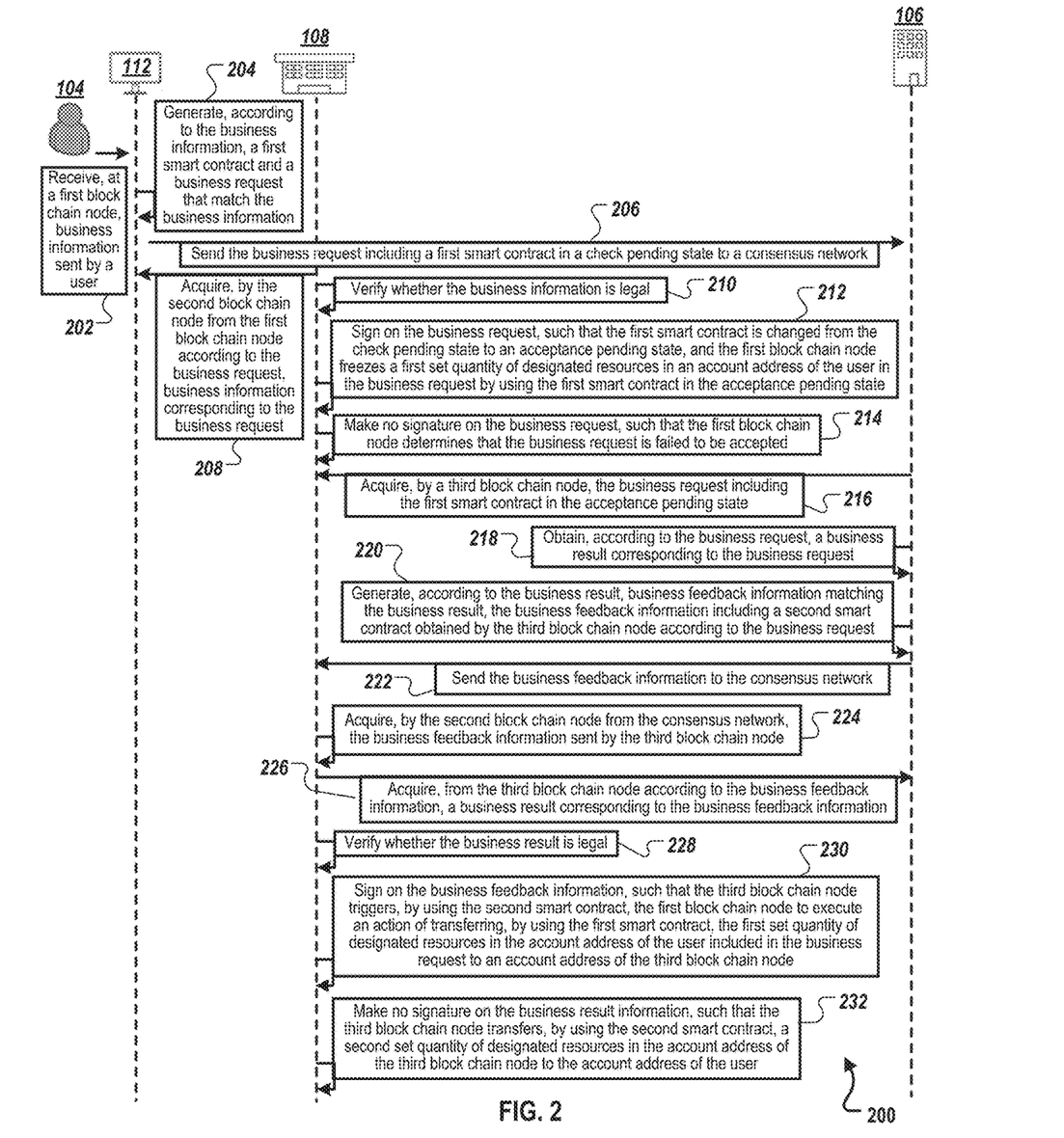
FIG. 2 is a swim lane diagram showing an example of a method for performing transaction processing, according to an implementation of the present disclosure.

FIG. 2 is a swim lane diagram showing an example of a method 200 for performing transaction processing, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a first block chain node receives business information sent by a user. For example, when the user 104 needs to carry out business processing through a transaction handling organization 106, the user 104 can send a business request to the transaction handling organization 106 through a terminal. The business request can be generated by the terminal according to the business information input by the user 104 in the terminal. For example, when intending to carry out business processing in the form of a real estate appraisal, a purchase agreement, a sales agreement, a contract, an agreement for providing a service, or some other business transaction, the user 104 can input their valid certificate information (for example, real estate information) and a reward demanded for this real estate appraisal. After receiving the information, the terminal can generate a corresponding real estate appraisal request according to the information.

The user 104 can input corresponding business information in the terminal during business processing. In addition to inputting information at a designated position of a terminal interface, the user 104 can also upload information to the terminal. The terminal can be, for example, the first block chain node 110a in the consensus network 102.

The first block chain node 110a can be, for example, a terminal or a server. For example, the user 104 can upload business information to the server by using the terminal, and the server can generate a corresponding business request according to the received business information. From 202, method 200 proceeds to 204.

At 204, a first smart contract matching the business information and a business request are generated according to the business information. For example, after receiving the business information sent by the user 104, the first block chain node 110a can generate, according to the business information, a first smart contract matching the business information. The first smart contract can designate that, once the second block chain node 110b verifies the legality of a business result generated by a third block chain node 110c according to the business request sent by the first block chain node 110a, the first block chain node 110a needs to execute a first designated operation by triggering the first smart contract. The first designated operation can be, for example, transferring designated resources (for example, monetary resources) from an account address of the user 104 to an account address of the third block chain node. The business information received by the first block chain node 110a can include the account address of the user 104, as well as a reward (for example, the designated resources) paid to the transaction handling organization 106 (for example, the third block chain node) for handling this transaction. Therefore, the first block chain node 110a can generate the first smart contract according to the account address of the user 104 and the reward paid by the user 104 to the transaction handling organization 106 which are included in the business information. The first smart contract can also be generated based on other business information.

In some implementations, the first block chain node 110a can compile the received business information by using a preset solidity commandline (SOLC) compiler to obtain the first smart contract. In addition, the first block chain node 110a can also generate the first smart contract by using other compilation techniques.

After generating the first smart contract, the first block chain node 110a can further generate a business request corresponding to the business information according to the received business information and the first smart contract. The business request can include the account address of the user 104 in addition to the first smart contract. Moreover, the business request can further include an information abstract of the business information (described in more detail below). The information abstract can be included in the business request in order to allow the first block chain node 110a to send the business request to the consensus network 102 without compromising user information. In some implementations, one or more block chain nodes in the consensus network 102 can view the business request in the consensus network 102. If the business request directly includes the business information uploaded by the user 104 in the first block chain node 110a, user information can be compromised, thus causing inconvenience to the user 104.

For example, if the business request is a real estate appraisal, the user 104 may send their detailed real estate information to the first block chain node 110a. If the first block chain node 110a is a service platform, it can be qualified platform certified by a related department, and thus can be trusted not to compromise information uploaded by the user 104. But, if the first block chain node 110a does not process the real estate information sent by the user 104 but instead directly adds the real estate information to the generated business request, once the business request enters the consensus network 102 the block chain nodes in the consensus network 102 can view the real estate information of the user 104. Assuming these additional block chain nodes, unlike the block chain node 110a, have not been certified by the related department, it is possible that sending the real estate information to the block chain network compromises user information.

Therefore, to protect the business information sent by the user 104 from being compromised, the first block chain node 110a can generate, according to the received business information, an information abstract of the business information. A data desensitization process can also be performed on the business information. The first block chain node 110a can add the information abstract to the business request and send the business request to the consensus network 102. As such, although all the block chain nodes in the consensus network 102 can view the business request, they can only view the information abstract in the business request and cannot obtain the real business information actually corresponding to the information abstract, and as such, the user information is protected.

In addition, another purpose of the information abstract can be as follows: as the information abstract is generated by the first block chain node 110a by using a preset information abstract algorithm and the received business information, the business information and the information abstract can have a unique corresponding relationship. Once content of the business information is changed, an information abstract generated by using the preset information abstract algorithm can be different from the previous information abstract. The information abstract generated before the content of the business information can be changed. As such, the objective of effectively checking whether the user 104 or another person (or a block chain node) has actively modified the business information in the subsequent procedure can be achieved.

In addition to being generated by the first block chain node 110a according to the business information sent by the user 104, the first smart contract can further be compiled by the user 104. Correspondingly, the user 104 can send the compiled first smart contract to the first block chain node 110a, such that the first block chain node 110a generates a business request including the first smart contract according to the business information sent by the user 104 and the first smart contract. From 204, method 200 proceeds to 206.

At 206, the business request including a first smart contract in a check pending state is sent to the consensus network 102. For example, after obtaining the business request, the first block chain node 110a can send the business request to the consensus network 102. The first block chain node 110a can send the business request to the consensus network 102 in the form of a transaction. For example, a small-amount transaction can be initiated, and the business request can be included in the transaction and sent to the consensus network 102. When the third block chain node 110c subsequently accepts this transaction, the third block chain node 110c can also accept the business request.

In some implementations, the smart contract can include a triggering condition for executing various actions. The triggering condition can be implemented by changing the state of the smart contract. Therefore, the first smart contract can have different states in different stages. Once the state is changed, the first smart contract can be triggered to transform to the next stage, that is, a different action can be triggered to be executed. On this basis, when the first block chain node 110a sends the business request to the consensus network 102, the state of the first smart contract in the business request can be changed from an initial non-state to a check pending state. As a result, the second block chain node 110b can verify, in a subsequent procedure, the legality of the business request including the first smart contract in the check pending state.

When the first block chain node 110a generates the first smart contract according to the received business information, the first smart contract can be in the check pending state. In other words, once the first smart contract is generated, an initial state can be the check pending state. Thereafter, the first block chain node 110a can send the business request, including the first smart contract in the check pending state, to the consensus network 102, such that the second block chain node 110b in the consensus network 102 can verify the legality of the business request. From 206, method 200 proceeds to 208.

At 208, the second block chain node acquires, from the first block chain node according to the business request, business information corresponding to the business request. For example, the block chain nodes in the consensus network 102 can have multiple business requests, and different business requests can be in different business processing stages. For example, some business requests can be sent from the first block chain node 110a to the consensus network 102, and some business requests can be executed to some extent. Marking the business processing stages of the business requests can be implemented by using states of smart contracts included in the business requests. Therefore, for some business requests that enter the consensus network 102, the second block chain node 110b (that is, the audit department 108) in the consensus network 102 can check the business requests including first smart contracts in the check pending state, and further verify the legality of such business requests in the subsequent procedure. From 208, method 200 proceeds to 210.

At 210, a verification is performed as to whether the business information is legal. In some implementations, this verification is performed by comparing the business information received to a set of legal requirements defined by a statute, administrative rule, or other legal authority. For example, if a statute specifies that the business information must include particular types of information, the business information would be determined to be legal if it includes the specified types of information, and determined to be illegal if it does not.

If the business information is legal, then method 200 proceeds from 210 to 212. If the business information is illegal, then method 200 proceeds from 210 to 214.

At 212, signing is performed on the business request, such that the state of the first smart contract is changed from the check pending state to an acceptance pending state. The first block chain node 110a freezes a first set quantity of designated resources in an account address of the user 104 in the business request by using the first smart contract in the acceptance pending state. From 212, method 200 proceeds to 216.

At 214, no signature is made on the business request, such that the first block chain node determines that the business request has failed to be accepted. For example, when viewing the business request, including the first smart contract in the check pending state from the consensus network 102, the second block chain node 110b can verify the legality of the business request. The verification can be conducted in order to prevent fraud by the transaction handling organization 106 on the user 104 or by the user 104 on the transaction handling organization 106. For example, when carrying out a real estate appraisal through the transaction handling organization 106, the user 104 can provide false real estate information inconsistent with reality to the transaction handling organization 106, such that the transaction handling organization 106 obtains a real estate appraisal report (for example, a business result) inconsistent with reality according to the real estate information provided by the user 104. This may give rise to a cause of action by the user 104 against the transaction handling organization 106 for the real estate appraisal report being inconsistent with reality. This can adversely affect the transaction handling organization 106. To avoid such a situation, before the third second block chain node 110b accepts and processes the business request sent by the first second block chain node 110b, the second block chain node 110b (for example, the audit department 108) can first verify the business request to ensure the legality of the business request.

When viewing the business request, including the first smart contract in the check pending state in the consensus network 102, the second block chain node 110b can acquire, from the first block chain node 110a, business information sent by the user 104 to the first block chain node 110a, and verify the legality of the business information. If the business information is verified as legal, then the second block chain node 110b can sign the business request in the consensus network 102. Once the business request is signed by the second block chain node 110b, the first smart contract in the business request can be changed from the check pending state to the acceptance pending state. As such, the third block chain node 110c can subsequently accept the business request including the first smart contract in the acceptance pending state. In other words, as the second block chain node 110b makes the signature on the business request, it can be assured, to some extent, that the business request accepted by the third block chain node 110c is a legal business request.

At the same time, once the second block chain node 110b signs the business request, the block chain nodes in the consensus network 102 can establish a consensus about the business request. Once the consensus is established, the business request can be recorded in block chains in the consensus network 102, that is, block chains of the block chain nodes. The information recorded in the block chains can be tamper-resistant. Therefore, after being recorded in the block chains, the business request can be used in a subsequent procedure for verifying whether the business information sent by the user 104 and the business result obtained by the third block chain node 110c (that is, the transaction handling organization 106) according to the business information, have been modified (as the business request includes the information abstract generated by the first block chain node 110a according to the business information). This can help to assure impartiality of the business processing method.

Moreover, once the second block chain node 110b determines the business information as legal and signs the business request, the first block chain node 110a can freeze the first set quantity of designated resources in the account address of the user 104 by using the first smart contract in the acceptance pending state for use in subsequent business settlement. In addition to verifying whether the business information acquired from the first block chain node 110a is legal, the second block chain node 110b can further verify whether the business information uniquely corresponds to the information abstract in the business request and whether the first smart contract in the business request is reasonably made. The second block chain node 110b can also analyze, by using a public key (or a private key) held by itself, the account address of the user 104 included in the business request, and determine the legality of the account address. Once the second block chain node 110b verifies all the items as legal, signing can be performed on the business request. As such, the block chain nodes in the consensus network 102 can establish a consensus about the business request, and the state of the first smart contract in the business request can be triggered to be changed from the check pending state to an acceptance pending state. Whether the second block chain node 110b uses a public key or a private key to analyze the account address of the user 104 included in the business request can depend on whether the first block chain node 110a uses a private key or a public key when generating the business request.

The second block chain node 110b can verify that the business request is illegal, for example, that at least one of the account addresses of the user 104 is illegal, the business information is inconsistent with the information abstract in the business request, the first smart contract is made unreasonably, and the business information is illegal. In this case, no signature is made on the business request, and the first block chain node 110a can determine that the business request has failed to be accepted. The first block chain node 110a can return a message indicating failure in acceptance of the business request to the user 104. The manner of determining, by the first block chain node 110a, that the business request has failed to be accepted can include the following. When the first block chain node 110a monitors, by using the first smart contract in the business request, that the second block chain node 110b still has not signed the business request after first set duration, a message indicating that the business request has failed to be accepted can be automatically triggered by using the first smart contract to be returned to the first block chain node 110a. The user 104 can learn, according to the message received by the first block chain node 110a, that the business request sent by using the first block chain node 110a has failed to pass the auditing carried out by the second block chain node 110b. Once verifying the business request as illegal, the second block chain node 110b can directly send, to the first block chain node 110a, the message indicating that the business request has failed to pass the auditing.

The second block chain node 110b can serve as the audit department 108 that can audit the business request and the business result sent by the transaction handling organization 106. Therefore, the second block chain node 110b can have permission to acquire the business information from the first block chain node 110a. It is a goal to protect the business information of the user 104 from being acquired by an illegal organization and compromised. Therefore, when the second block chain node 110b views the business request and needs to verify the legality of the business request, a security certificate held by the second block chain node 110b can be sent to the first block chain node 110*a*. The first block chain node 110*a* can then verify the qualification of the second block chain node 110*b* by using the security certificate. Once it is determined that the second block chain node 110*b* has the right to verify the legality of the business information sent by the user 104, the second block chain node 110*b* can be authorized to acquire, from the first block chain node 110*a*, the business information sent by the user 104. Otherwise, the permission is not granted to the second block chain node 110*b*. From 214, method 200 proceeds to 216.

At 216, the third block chain node acquires the business request, including the first smart contract in the acceptance pending state. For example, after verifying, by using the business request, the business information corresponding to the business request as legal, the second block chain node 110*b* can sign the business request to trigger the first smart contract in the business request to change from the check pending state to the acceptance pending state. The business request, including the first smart contract in the acceptance pending state, can be a business request verified by the second block chain node 110*b* (for example, the audit department 108), and therefore, the business request can be determined to be legal. As a result, the third block chain node 110*c* (for example, the transaction handling organization 106) can subsequently accept the business request including the first smart contract in the acceptance pending state. As indicated by step 206, the first block chain node 110*a* can add the business request to a transaction and send the transaction to the consensus network 102. Therefore, the third block chain node 110*c* can accept the transaction sent by the first block chain node 110*a*, being equivalent to accepting the business request.

After the third block chain node 110*c* receives the business request, the first smart contract in the business request can change from the acceptance pending state to a state of being accepted. This is because there can be multiple third block chain nodes 110*c* in the consensus network 102 in an actual application, that is, there can exist multiple transaction handling organizations 106. Generally, after one transaction handling organization 106 accepts the business request, another transaction handling organization 106 should no longer accept the business request. If the business request is accepted repeatedly, multiple business results can occur, which can cause trouble for the user 104 and business disputes for the transaction handling organizations 106. To avoid the situation, once a third block chain node 110*c* accepts the business request, the first smart contract in the business request can change from the acceptance pending state to the state of being accepted. As such, another third block chain node 110*c* (for example, another transaction handling organization 106) will not accept the business request again when noticing that the first smart contract in the business request is in the state of being accepted, and as such, prevent the business request from being accepted repeatedly.

When the first block chain node 110*a* sends the business request to the consensus network 102, the block chain nodes (including the second block chain node 110*b* and the third block chain node 110*c*) in the consensus network 102 can all receive the business request. The state of the first smart contract generally needs to be synchronized among the block chain nodes. Therefore, when signing on the business request, the second block chain node 110*b* can send a message indicating that the business request passes the verification to another block chain node in the consensus network 102. After the third block chain node 110*c* in the consensus network 102 receives the message, the first smart contract in the business request existing in the third block chain node 110*c* can be automatically triggered to change its own state to the acceptance pending state. As such, in the subsequent procedure, the third block chain node 110*c* can process the business request, including the first smart contract, in the acceptance pending state.

In addition, the first block chain node 110*a* can first send the business request to the second block chain node 110*b* in the consensus network 102. When it is determined that the business request passes the verification, the second block chain node 110*b* can sign the business request, such that the state of the first smart contract in the business request changes to the acceptance pending state. The business request, including the first smart contract in the acceptance pending state, can then be sent to the block chain nodes in the consensus network 102. At the same time, the second block chain node 110*b* can return to the first block chain node 110*a* a message indicating that the business request passes the verification. The first block chain node 110*a* can change the state of the first smart contract of the business request stored therein to the acceptance pending state. Likewise, when receiving the business request including the first smart contract in the acceptance pending state, the third block chain node 110*c* can receive and process the business request.

The second block chain node 110*b* can also synchronize the state of the first smart contract by hedging. That is, the first block chain node 110*a* can first send the business request to the block chain nodes in the consensus network 102. At this time, in the block chain nodes (including the second block chain node 110*b* and the third block chain node 110*c*), the states of the first smart contracts in the business requests can both be the check pending state. When receiving the business request, including the first smart contract in the check pending state, the third block chain node 110*c* can decide not to process the business request. At the same time, when receiving the business request, including the first smart contract in the check pending state, other block chain nodes can decide not to establish a consensus about the business request.

After receiving the business request, the second block chain node 110*b* can verify the business request. Once the business request is verified as legal, the state of the first smart contract in the second block chain node 110*b* can be changed by means of signing, that is, changing to the acceptance pending state. The second block chain node 110*b* can then send the business request including the first smart contract in the acceptance pending state to the block chain nodes in the consensus network 102. After receiving the business request, including the first smart contract in the acceptance pending state, the block chain nodes can cover (or remove) the previously-received business request including the first smart contract in the check pending state, and establish a consensus about the business request including the first smart contract in the check pending state. At the same time, the third block chain node 110*c* can process the business request to obtain a corresponding business result. From 216, method 200 proceeds to 218.

At 218, a business result corresponding to the business request is obtained according to the business request. For example, after acquiring the business request, the third block chain node 110*c* (for example, the transaction handling organization 106) can obtain the corresponding business result according to the business request. The business request can include an abstract of information rather than the information itself, and the third block chain node 110*c* cannot obtain a reasonable business result according to the information abstract. Therefore, the third block chain node 110c can acquire the business information corresponding to the information abstract from the first block chain node 110a, and as such, obtain the corresponding business result according to the business information.

On this basis, after acquiring the business request, the third block chain node 110c can send a message for accepting the business request to the first block chain node 110a. When the user 104 views the message by using the first block chain node 110a and allows the third block chain node 110c to accept the business request sent by the user 104, a message for allowing the acceptance can be returned to the third block chain node 110c by using the first block chain node 110a. The first block chain node 110a can then be enabled to grant access permission to the third block chain node. After receiving the message for allowing the acceptance returned by the first block chain node 110a (for example, after it is monitored that the first block chain node 110a allows the third block chain node 110c to accept the business request), the third block chain node 110c can acquire, from the first block chain node 110a, the business information corresponding to the business request according to the access permission acquired from the block chain node and the business request. The first block chain node 110a can set an access permission for the first block chain node 110a so as to prevent illegal organizations from acquiring and leaking the business information of the user 104.

After acquiring the business information from the first block chain node 110a, the third block chain node 110c can obtain the business result corresponding to the business information according to the business information. The business result can be produced by a business handling specialist. The business handling specialist can upload the business result on the third block chain node so that the business result is obtained. From 218, method 200 proceeds to 220.

At 220, business feedback information matching the business result is generated according to the business result, the business feedback information, including a second smart contract obtained by the third block chain node 110c, according to the business request. For example, after the third block chain node 110c obtains the business result, the business result may need to be audited by the second block chain node 110b in the consensus network 102 in the subsequent procedure. The third block chain node 110c cannot directly send the business information to the consensus network 102 as the business result obtained by the third block chain node 110c can reflect the business information of the user 104. If an illegal organization obtains the business result, an illegal operation can be carried out on property of the user according to the business result, which may cause losses to the user 104.

Therefore, after the third block chain node 110c acquires the business result from the first block chain node 110a, the third block chain node 110c can generate the business feedback information matching the business result according to the obtained business result. The third block chain node 110c can generate a result abstract of the business result by using a preset information abstract algorithm, add the result abstract to the subsequently generated business feedback information, and send the business feedback information to the consensus network 102. In addition, to effectively prevent the business information from being compromised, the result abstract can further provide a powerful basis for subsequent verification on whether the third block chain node 110c modifies the obtained business result. Verification can occur because the result abstract uniquely corresponds to the business result. If content in the business result is changed, it is impossible to obtain a result abstract identical to the previous one according to the changed business result by using the same information abstract algorithm.

In addition, the third block chain node 110c can further generate a second smart contract matching the business result according to the obtained business result, and add the second smart contract to the subsequently generated business feedback information. This is because in an actual application, the transaction handling organization 106 can cheat the user 104, for example, by obtaining a false business result according to real business information provided by the user 104. The transaction handling organization 106 can refuse to admit the cheating behavior on the user 104, and therefore, the user 104 can fail to obtain the corresponding compensation.

The second block chain node 110b (for example, the audit department 108) can verify the business result information sent by the third block chain node. If it is found that the business feedback information does not include the second smart contract capable of automatically triggering compensation for the user 104 once there is a cheating behavior on the user 104 (even if the third block chain node 110c executes a second designated operation by using the second smart contract), the second block chain node 110b can decide not to accept the business feedback information or can determine that the business feedback information fails to be accepted. So that the business feedback information subsequently sent to the second block chain node 110b can pass the verification carried out by the second block chain node 110b, the third block chain node 110c can generate a second smart contract matching the business request according to the business request. The second smart contract can be added to the subsequently generated business feedback information, and the business feedback information can be sent to the consensus network 102.

When receiving, from the first block chain node 110a, the business information corresponding to the business request, the third block chain node 110c can compile the business information by using a preset SOLC compiler to obtain the second smart contract. The third block chain node 110c can also compile the second smart contract using other compilation techniques.

The business request can include, in the first smart contract, a reward paid by the user 104 for the business handling. Therefore, the third block chain node 110c can directly compile the business request by using the preset SOLC compiler to obtain the second smart contract matching the business request.

In addition, the third block chain node 110c can make various second smart contracts in advance, for example, using different second smart contracts corresponding to different business types and business levels. For example, for a business request having a high business level, a second smart contract corresponding to such a type of business request can have a higher claim amount. Business requests of a same business level but different business types can correspond to different second smart contracts. Therefore, the third block chain node 110c can make different second smart contracts according to different business types and different business levels, and the second smart contracts can be stored in the third block chain node.

After gaining the business request including the first smart contract in the acceptance pending state, the third block chain node 110c can further determine a business level and a business type of the business request. A matching second smart contract can be determined according to the business level and business type as well as the first set quantity of designated resources specified in the first smart contract (for example, the business reward specified by the user 104). Then, the determined second smart contract can be added to the generated business feedback information, and the business feedback information can be sent to the consensus network 102.

In some implementations, an account address of the third block chain node 110*c* can be required when the user 104 pays the reward for the business handling to the third block chain node 110*c* (for example, the transaction handling organization 106) and when the third block chain node 110*c* compensates the user 104. In addition to including the second smart contract and the result abstract, the business feedback information generated by the third block chain node 110*c* can further include the account address of the third block chain node. Furthermore, once the second block chain node 110*b* determines the business result obtained by the third block chain node 110*c* is legal, the business feedback information sent by the third block chain node can be signed. Then, the second smart contract in the business feedback information can be triggered to activate the first smart contract in the business request to execute an action of transferring the first set quantity of designated resources (for example, a certain amount of money) in the user account to the account address of the third block chain node 110*c*. Therefore, the second smart contract needs to be associated with the first smart contract in the business request, such that the second smart contract can trigger the first smart contract to execute the action subsequently. From 222, method 200 proceeds to 224.

At 222, the business feedback information is sent to the consensus network. For example, after obtaining the business feedback information, the third block chain node 110*c* can send the business feedback information to the consensus network 102. When the business feedback information is sent to the consensus network 102, the second smart contract in the business feedback information can be changed from an initial non-state to a verification pending state. As such, the second block chain node 110*b* in the consensus network 102 can acquire the business feedback information including the second smart contract in the verification pending state and verify the legality of the business feedback information when it is determined that the second smart contract in the business feedback information is in the verification pending state.

Once the third block chain node 110*c* sends the business feedback information to the consensus network 102, the second smart contract in the business feedback information can trigger, using the state change, the third block chain node 110*c* to freeze a second set quantity of designated resources in the account address of the third block chain node 110*c* by using the second smart contract. This can help to assure that, once the business result obtained by the third block chain node 110*c* according to the business request is verified as illegal, the third block chain node 110*c* can transfer this part of frozen designated resources to the account of the user 104 by triggering the second smart contract.

In some implementations, when sending the business feedback information, the third block chain node 110*c* can add the business feedback information to a transaction and send the transaction to the consensus network 102. The transaction can directly designate the second block chain node 110*b* in the consensus network 102 as a transaction object for transaction. From 222, method 200 proceeds to 224.

At 224, the second block chain node acquires, from the consensus network, the business feedback information sent by the third block chain node. For example, after receiving the business feedback information that is sent by the third block chain node 110*c* and includes the second smart contract in the verification pending state, the second block chain node 110*b* can accept the business feedback information. Acceptance can include receiving a transaction that includes the business feedback information and verifying the legality of the business feedback information in the subsequent procedure. From 224, method 200 proceeds to 226.

At 226, a business result corresponding to the business feedback information is acquired from the third block chain node according to the business feedback information. For example, after acquiring the business feedback information, the second block chain node 110*b* can determine the business result corresponding to the business feedback information according to the business feedback information. The business feedback information may not include a real business result, but can include a result abstract uniquely corresponding to the business result. The business feedback information can also include the business result, but data desensitization can be carried out for the business result when the third block chain node 110*c* sends the business result, so as to protect private information of the user 104. Therefore, the second block chain node 110*b* can acquire the business result corresponding to the business feedback information from the third block chain node, and then verify the legality of the business result in the subsequent procedure.

The second block chain node 110*b* (for example, the audit department 108) can be a department that can verify the legality of the business result obtained by the third block chain node. The second block chain node 110*b* can have the permission of directly acquiring the business result from the third block chain node. The third block chain node 110*c* can also limit the permission of the second block chain node 110*b* to more effectively protect the private information of the user 104 from being compromised. Correspondingly, if the third block chain node 110*c* limits the access permission of the second block chain node 110*b*, when receiving and accepting the business feedback information sent by the third block chain node 110*c* to the consensus network 102, the second block chain node 110*b* can send a query message for accepting the business feedback information to the third block chain node, add a security certificate to the query message, and send the query message to the third block chain node. After receiving the query message, the third block chain node 110*c* can verify the security certificate.

Upon verification, if the security certificate has a qualification of verifying the business feedback information and the second block chain node 110*b* is allowed to verify the business feedback information, a feedback message indicating acceptance approval can be returned to the second block chain node 110*b*, and an access permission allowing acquisition of the business result from the third block chain node 110*c* can be granted to the second block chain node 110*b*. Then, the second block chain node 110*b* can acquire, from the third block chain node, the business result corresponding to the business feedback information based on the access permission. From 226, method 200 proceeds to 228.

At 228, a verification is performed as to whether the business result is legal (as described above). If the business result is legal, then method 200 proceeds to 230. If the business result is illegal, then method 200 proceeds to 232.

At 230, signing is performed on the business result information. For example, the third block chain node 110*c* can trigger the second smart contract to enable the first block chain node 110*a* to execute an action of transferring the first set quantity of designated resources in the account address of the user included in the business request to the account address of the third block chain node 110*c* by using the first smart contract. After 230, method 200 stops.

At 232, no signature is made on the business result information. For example, the third block chain node 110*c* can transfer, by using the second smart contract, the second set quantity of designated resources in the account address of the third block chain node 110*c* to the account address of the user 104. After 232, method 200 stops.

When the second block chain node 110*b* acquires, from the third block chain node, the business result corresponding to the business feedback information, the second block chain node 110*b* can verify the legality of the business result. Verification can include verifying the feasibility of the business result according to the business information as the second block chain node 110*b* has acquired, from the first block chain node 110*a*, the business information sent by the user 104 to the first block chain node 110*a*. This can confirm whether the business result truly reflects actual conditions recorded by the business information and makes an effective and objective evaluation on the business information. If so, then the business result can be determined to be a legal business result. Otherwise, the business result can be determined to be cheating.

In some implementations, the second block chain node 110*b* can parse the business feedback information by using a public key or a private key (held by the second block chain node 110*b*) to obtain the account address of the third block chain node 110*c* included in the business feedback information. Then, the second block chain node 110*b* can determine whether the account address is legal and verify whether the second smart contract included in the business feedback information is applicable to the business information sent by the user 104 at the first block chain node 110*a* and the first smart contract included in the business request. For example, the second block chain node 110*b* can determine whether a compensation amount involved in the second smart contract matches the business type and business level of the business information and the business reward specified in the first smart contract. If the aspects are all verified as legal, the business feedback information sent by the third block chain node 110*c* can be determined as legal. Otherwise, the business feedback information can be determined as illegal.

When the third block chain node 110*c* verifies the business feedback information as legal, signing can be performed on the business feedback information to trigger the second smart contract in the business feedback information to change from the verification pending state to a verification successful state. The third block chain node 110*c* can trigger, by using the second smart contract, the first smart contract associated with the second smart contract to transfer the first set quantity of designated resources. This can include, for example, the reward paid to the transaction handling organization 106 specified in the first smart contract. The second smart contract can include the account address of the user 104 in the business request to the account address of the third block chain node. Once the second block chain node 110*b* signs on the business feedback information, the block chain nodes in the consensus network 102 can establish a consensus about the business feedback information. After the consensus about the business feedback information is established, the business feedback information can be written in the block chains in the consensus network 102. In other words, the block chain nodes can write the business feedback information, about which the consensus is established, into respective block chains. The data information written into the block chains can be tamper-resistant. Therefore, it can be effectively verified, by using the result abstract included in the business feedback information written into the block chains, whether the user 104 or the transaction handling organization 106 as the third block chain node 110*c* modifies the corresponding business result subsequently, and as such, provide a powerful basis for the verification on whether the business result is modified.

When the second block chain node 110*b* verifies the business feedback information as illegal, no signature is made on the business feedback information. As such, when it is monitored, by using the second smart contract, the second block chain node 110*b* still does not sign the business feedback information after first set duration, that the third block chain node 110*c* can automatically trigger, by using the second smart contract, the action of transferring the second set quantity of designated resources (for example, the money for compensation) in the account address of the third block chain node 110*c* to the account of the user 104. Once the second block chain node 110*b* makes no signature on the business feedback information, the block chain nodes in the consensus network 102 can end up not establishing a consensus about the business feedback information, that is, the business feedback information can be equivalently discarded.

The states of the second smart contract in the consensus network 102 can be synchronized. The specific synchronization manner can be similar to the state synchronization manner of the first smart contract. Once the second block chain node 110*b* determines the business result obtained by the third block chain node 110*c* according to the business information as legal and signs on the business feedback information, the state of the second smart contract of the business feedback information in the third block chain node 110*c* can be changed to the verification successful state. In this case, the block chain node can send a message indicating that the business result is verified as legal to the first block chain node 110*a* by using the second smart contract in the verification successful state. After receiving the message, the first block chain node 110*a* can transfer, by using the first smart contract, the first set quantity of designated resources in the user account address to the account address of the third block chain node. In other words, the message sent by the third block chain node 110*c* to the first block chain node 110*a* can be considered as a condition for triggering the first block chain node 110*a* to transfer the designated resources by using the first smart contract.

When it is determined that the business result passes the verification, the second block chain node 110*b* can send a message indicating that the business result passes the verification to the first block chain node 110*a*. The first smart contract can trigger transfer of the first set quantity of designated resources to the account address of the third block chain node 110*c*.

After it is determined that the business result passes the verification carried out by the second block chain node 110*b*, the third block chain node 110*c* can notify the first block chain node 110*a* of the message indicating that the business result passes the verification. Therefore, after receiving the message, the first block chain node 110*a* can acquire the business result from the third block chain node. The third block chain node 110*c* can also actively push the business result that passes the verification carried out by the second block chain node 110*b* to the first block chain node 110*a*.

After it is determined that the business result passes the verification, the second block chain node 110b can also send the message indicating that the business request passes the verification to the first block chain node 110a, such that the first block chain node 110a acquires the business result from the second block chain node 110b after receiving the message. The second block chain node 110b can also actively push the business request that passes the verification to the first block chain node 110a.

The first block chain node 110a and the third block chain node 110c can automatically accomplish payment of a reward or compensation by using a smart contract without requiring manual intervention. Moreover, the whole business handling process can be implemented under the supervision and verification of the second block chain node 110b. This can effectively guarantee the impartiality of the whole business handling process. Further, once the business request sent by the first block chain node 110a to the consensus network 102 and the business feedback information sent by the third block chain node 110c to the consensus network 102 are verified as legal by the second block chain node 110b, the block chain nodes in the consensus network 102 can further establish a consensus about the business request and the business feedback information. After the consensus is established, the business request and the business feedback information can be written into the block chains in the consensus network 102. This can provide a powerful basis for verification on whether the business information sent by the user 104 and the business result obtained by the third block chain node 110c are modified.

In some implementations, the verification on the legality of the business request and the business feedback information can be implemented by the second block chain node 110b or multiple second block chain nodes 110b. The second block chain nodes 110b can be construed as some departments or organizations having credibility. The second block chain nodes 110b can form a regional consortium chain consensus network 102. When viewing the business request sent by the first block chain node 110a in the consensus network 102, the second block chain nodes 110b in the regional consortium chain consensus network 102 can acquire business information corresponding to the business request from the first block chain node 110a and verify the legality of the business information. Each second block chain node 110 can then broadcast an obtained verification result to other second block chain nodes 110b, such that the block chain nodes establish a consensus about the verification result. Each second block chain node 110 can also obtain an overall final verification result. Further, a second block chain node 110b currently serving as a leader node determines, according to the final verification result, whether to sign the business request.

In some implementations, after the third block chain node 110c sends the business feedback information to the consensus network 102, the second block chain node 110b, serving as a leader node in the regional consortium chain consensus network 102, can accept the business feedback information. The second block chain node 110b can then instruct the other second block chain nodes to acquire, from the third block chain node, the business results corresponding to the business feedback information. After acquiring the business results, the second block chain nodes can verify the legality of the business results respectively to obtain respective verification results. The second block chain nodes can then broadcast respective verification results to each other, such that the second block chain nodes in the regional consortium chain consensus network 102 establish a consensus about the verification results and obtain a final verification result. Further, the second block chain node, currently serving as the leader node, can determine, according to the final verification result, whether to sign the business result information.

After viewing the business request sent by the first block chain node 110a, the second block chain node 110b typically cannot immediately verify the legality of the business request. Instead, the second block chain node 110b can verify the legality of the business information corresponding to the business request, as well as the legality of the business request at the same time after the third block chain node 110c obtains the corresponding business result according to the business request.

The second block chain node 110b can receive the business request including the first smart contract and the user account address from the first block chain node 110a and can receive the business feedback information including the second smart contract and the account address of the third block chain node 110c from the third block chain node. Therefore, when the second block chain node 110b verifies the business result as legal, the first set quantity of designated resources in the user account address can be transferred to the account address of the third block chain node 110c by using the first smart contract. Likewise, when the second block chain node 110b verifies the business result as illegal, the second set quantity of designated resources in the account address of the third block chain node 110c can be transferred to the account address of the user 104 by using the second smart contract.

In the process of verifying the legality of the business request and the business feedback information, if the business information corresponding to the business request and the business result corresponding to the business feedback information are overly complex, the second block chain node 110b can ask a lawyer or another audit department 108 to intervene to implement the legality verification. The intervening lawyer or audit department 108 can sign a corresponding statement of responsibility, and the second block chain node 110b can write the statement of responsibility into the block chain of the consensus network 102 by initiating a transaction for use if liability disputes subsequently occur.

The first designated operation executed by the first block chain node 110a by using the first smart contract can be transferring the first set quantity of designated resources in the user account address in the business request to the account address of the third block chain node. For example, the first designated operation can be used for enabling the first block chain node 110a to automatically acquire the business result from the third block chain node 110c or the second block chain node 110b. In another example, the first designated operation can be used for enabling the first block chain node 110a to determine a resource transfer time limit of transferring the first set quantity of designated resources in the user account address to the account address of the third block chain node. After the resource transfer time limit expires, the first block chain node 110a can transfer the first set quantity of designated resources in the user account address to the account address of the third block chain node. The first designated operation can also be in other forms.

The second designated operation is not limited to enabling the third block chain node 110c to transfer the second set quantity of designated resources in the account of the third block chain node 110c to the account address of the user 104. For example, the second designated operation can also be used for enabling the third block chain node 110c to change the state of the first smart contract in the business request (for example, the business request received and processed by the third block chain node) to the acceptance pending state and send the business request to the consensus network 102. As a result, another block chain node capable of processing the business request can receive and process the business request. The second designated operation can also be in other forms.

It should be further noted that the business processing procedure described in the present disclosure can be performed in the case of asset appraisal. For example, the first block chain node 110a can be a terminal held by the user 104, and the business information received by the first block chain node 110a can be asset appraisal information and valid personal certificate information of the user 104 that are sent by the user 104. The business request generated by the first block chain node 110a according to the information sent by the user 104 can be an asset appraisal request. The second block chain node 110b can be an audit department 108 that can carry out audition and supervision on the asset appraisal. The third block chain node 110c can be an asset appraisal organization that can handle the asset appraisal business for the user 104. The business result obtained by the third block chain node 110c according to the business information acquired from the first block chain node 110a can be an asset appraisal report. The business feedback information sent to the second block chain node 110b can be asset appraisal report information.

The business processing method described in the present disclosure can be used for asset appraisal, and can further be used for processing other businesses. For example, in real life, an accounting firm generally deals with businesses of applying for enterprise operation administrative licenses on behalf of some enterprises or individuals. An individual or an enterprise can submit a valid certificate and enterprise data to the accounting firm. The accounting firm can obtain related materials according to the data and submit the materials to a related department (for example, the industrial and commercial bureau) for examination and approval. If it is determined that the materials are consistent with actual situations of the individual or enterprise, then the related department can grant an enterprise operation license to the individual or enterprise. In this process, the individual or enterprise can pay a reward to the entrusted accounting firm. As a result, the accounting firm can accomplish a related application for the enterprise operation license on behalf of the individual or enterprise.

In some implementations, the techniques described in the present disclosure can also apply to scenarios in which an accounting firm applies for an enterprise operation license on behalf of an individual or enterprise. That is, the individual or enterprise, as a client, can send enterprise data and a valid certificate to a first block chain node 110a. The first block chain node 110a can generate a corresponding first smart contract and a business request according to the received materials. The first block chain node 110a can then send the business request to a consensus network 102. After viewing the business request, a related department (for example, the industrial and commercial bureau) as a second block chain node 110b can acquire, from the first block chain node 110a, related data corresponding to the business request, and verify the legality of the related data. Once the data is verified as legal, signing can be performed on the business request. As a result, an accounting firm serving as a third block chain node 110c can accept the signed business request, acquire from the first block chain node 110a the related data sent by the individual or enterprise, and obtain corresponding related materials according to the acquired related data.

The accounting firm serving as the third block chain node 110c can generate a corresponding second smart contract and a declaration application according to the obtained related materials, and can send the declaration application to the consensus network 102. As such, after viewing the declaration application from the consensus network 102, the second block chain node 110b can acquire the related materials from the third block chain node, and can verify the related materials according to the related data acquired from the first block chain node 110a.

When verifying the related materials as legal, the second block chain node 110b can sign the declaration application sent by the third block chain node. As a result, the third block chain node 110c can trigger, by using the second smart contract, the first block chain node 110a to execute automatic transfer of a certain amount money in an account address of the individual or enterprise as a reward to an account address of the accounting firm as the third block chain node 110c by using the first smart contract in the business request. At the same time, the related department serving as the second block chain node 110b can grant an enterprise operation license to the individual or enterprise. When verifying the related materials as illegal, the second block chain node 110b need not sign the declaration application. As such, when monitoring, by using the second smart contract in the declaration application, the second block chain node 110b does not sign the declaration application after set duration. Also, the third block chain node 110c can automatically trigger, by using the second smart contract, the transfer of a certain amount of money in the account address of the accounting firm as a compensation to the account address of the individual or enterprise.

Figure 3:
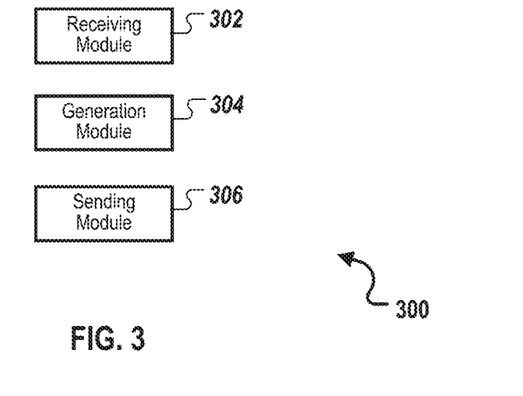
FIG. 3 is a block diagram of an example of a processing system, according to an implementation of the present disclosure.

FIG. 3 is a block diagram of an example of a processing system 300, according to an implementation of the present disclosure. A receiving module 302 can be configured to receive business information sent by a user. A generation module 304 can be configured to generate a corresponding business request according to the business information, the business request including a first smart contract generated according to the business information. A sending module 306 can be configured to send the business request to a consensus network 102, such that a third block chain node 110c in the consensus network 102 obtains a corresponding business result according to the business request, and execute a first designated operation by triggering the first smart contract after it is determined that a second block chain node 110b in the consensus network 102 verifies the business result as legal.

In some implementations, the generation module 304 can be configured to compile the business information by using a preset SOLC compiler to obtain the first smart contract. In some implementations, the generation module 304 can be configured to generate, according to the business information, the business request including the first smart contract and an account address of the user, the first designated operation being used for transferring a first set quantity of designated resources in the account address of the user to an account address of the third block chain node.

In some implementations, the sending module 306 can be configured to send the business request including a first smart contract in a check pending state to the consensus network 102. In some implementations, the sending module 306 can be configured to, when it is determined that the second block chain node 110b verifies the business request as legal, freeze the first set quantity of designated resources in the account address of the user by using the first smart contract. In some implementations, the sending module 306 can be configured to receive a query message, sent by the third block chain node, for processing the business request and grant access permission to the third block chain node 110*c* when it is determined that the business request is processed by the third block chain node, such that the third block chain node 110*c* acquires the business information from the apparatus and obtains the business result according to the business information.

In some implementations, the sending module 306 can be configured to send the business request to block chain nodes in the consensus network 102 to establish a consensus. In some implementations, the sending module 306 can be configured to write the business request into a block chain of the apparatus when it is determined that the consensus about the business request is established by the block chain nodes in the consensus network 102. In some implementations, the sending module 306 can be configured to acquire the business result from the third block chain node 110*c* or the second block chain node 110*b* when it is determined that the second block chain node 110*b* verifies the business result as legal.

In some implementations, the sending module 306 can include a generation module 304. After the sending module 306 determines that the consensus about the business request is established by the block chain nodes in the consensus network 102, the generation module 304 can write the business request to the block chain of the apparatus. In some implementations, the sending module 306 can include an acquisition module 305. After the sending module 306 determines that the second block chain node 110*b* verifies the business result as legal, the acquisition module 305 acquires the business result from the third block chain node 110*c* or the second block chain node 110*b*.

Figure 4:
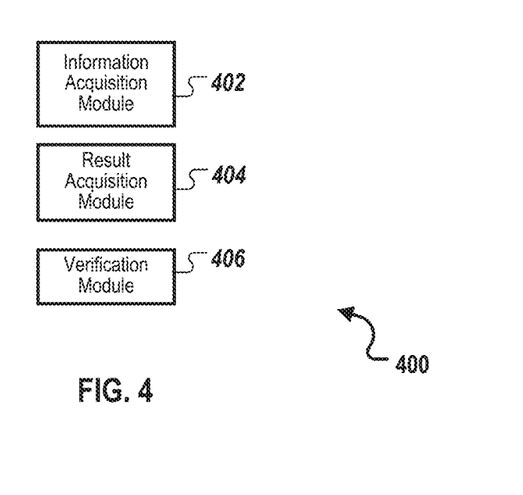
FIG. 4 is a block diagram of an example of a second processing system, according to an implementation of the present disclosure.

FIG. 4 is a block diagram of an example of a business system 400, according to an implementation of the present disclosure. An information acquisition module 402 can be configured to acquire, from a consensus network 102, business feedback information sent by a third block chain node. A result acquisition module 404 can be configured to acquire a business result from the third block chain node 110*c* according to the business feedback information, the business result being generated by the third block chain node 110*c* according to a business request sent by a first block chain node 110*a* to the consensus network 102. A verification module 406 can be configured to, when verifying the business result as legal, enable the first block chain node 110*a* to execute a first designated operation by triggering the first smart contract.

In some implementations, the verification module 406 can be configured to sign the business feedback information. The signature can be used for enabling a second smart contract included in the business feedback information to change its own state from a verification pending state to a verification successful state, where the second smart contract can be obtained by the third block chain node 110*c* according to the business request. The second smart contract in the verification successful state can be used for enabling the second smart contract to trigger the first block chain node 110*a* to execute the first designated operation by using the first smart contract.

In some implementations, the verification module 406 can be configured to, when verifying the business result as legal, instruct block chain nodes in the consensus network 102 to establish a consensus about the business feedback information, and, when it is determined that the consensus about the business feedback information is established, write the business feedback information into a block chain of the apparatus. In some implementations, the verification module 406 can be configured to, when verifying the business result as illegal, refuse to sign the business feedback information. The refusing to sign can be used for enabling the third block chain node 110*c* to execute a second designated operation by triggering the second smart contract.

In some implementations, the information acquisition module 402 can be configured to acquire a business request sent by the first block chain node 110*a* to the consensus network 102, the business request including a first smart contract in a check pending state. The information acquisition module 402 can acquire, from the first block chain node 110*a* according to the business request, business information corresponding to the business request. The information acquisition module 402 can verify whether the business information is legal. If the business information is legal, then the information acquisition module 402 can sign the business request to trigger the first smart contract to change from the check pending state to an acceptance pending state, the first smart contract in the acceptance pending state being used for enabling the first block chain node 110*a* to freeze the first set quantity of designated resources in the account address of the user by using the first smart contract. If the business information is illegal, then the information acquisition module 402 can refuse to sign the business request, such that the first block chain node 110*a* determines that the business request is failed to be accepted.

In some implementations, the verification module 406 can be configured to, when verifying the business information as legal, notify block chain nodes in the consensus network 102 to establish a consensus about the business request, and write the business request to the block chain of the apparatus when it is determined that the consensus about the business request is established. In some implementations, the information acquisition module 402 can include a result acquisition module 404. After the information acquisition module 402 acquires the business request from the first block chain node 110*a*, business information corresponding to the business request can be acquired from the first block chain node 110*a*. The information acquisition module 402 can then verify whether the business information is legal by using the result acquisition module 404.

Figure 5:
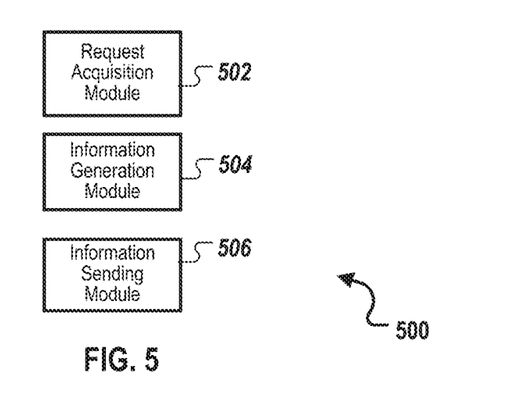
FIG. 5 is a block diagram of an example of a third processing system, according to an implementation of the present disclosure.

FIG. 5 is a block diagram of an example of a third processing system 500, according to an implementation of the present disclosure. A request acquisition module 502 can be configured to acquire a business request sent by a first block chain node 110*a* using a consensus network 102, the business request including a first smart contract generated by the first block chain node 110*a* according to business information sent by a user. An information generation module 504 can be configured to obtain a business result and a business feedback information according to the business request. An information sending module 506 can be configured to send the business feedback information to the consensus network 102, such that a second block chain node 110*b* in the consensus network 102 acquires the business result from the apparatus according to the business feedback information. When the business result is verified as legal, the information sending module 506 can enable the first block chain node 110*a* to execute a first designated operation by triggering the first smart contract.

In some implementations, the request acquisition module 502 can be configured to gain the business request including the first smart contract in an acceptance pending state. In some implementations, the first designated operation can be used for enabling the first block chain node 110a to transfer a first set quantity of designated resources in an account address of the user included in the business request to an account address of the apparatus.

In some implementations, the information generation module 504 can be configured to obtain a second smart contract and the business result according to the business request. In some implementations, the information generation module 504 can be configured to generate, according to the business result, the business feedback information including the second smart contract, abstract information of the business result, and the account address of the apparatus.

In some implementations, the information generation module 504 can be configured to determine a business level and a business type of the business request and determine the second smart contract according to the business level, the business type, and the first smart contract. In some implementations, the information generation module 504 can be configured to send, according to the business request, a query message for processing the business request to the first block chain node 110a. The information generation module 504 can acquire an access permission from the first block chain node 110a when a feedback message that is returned by the first block chain node 110a and allows the apparatus to process the business request is received. The information generation module 504 can acquire, from the first block chain node 110a, business information corresponding to the business request according to the business request and the access permission and obtain the business result and the business feedback information according to the business information.

In some implementations, the information generation module 504 can be configured to compile the business information by using a preset SOLC compiler to obtain the second smart contract. In some implementations, the information generation module 504 can be configured to send the business feedback information to the consensus network 102 and freeze a second set quantity of designated resources in the account address of the apparatus by triggering the second smart contract.

In some implementations, the information generation module 504 can be configured to send the business feedback information to block chain nodes in the consensus network 102 to establish a consensus and write the business feedback information into a block chain of the apparatus when it is determined that the consensus about the business feedback information is established by the block chain nodes in the consensus network 102. In some implementations, the information generation module 504 can be configured to execute a second designated operation by triggering the second smart contract when it is determined that the second block chain node 110b verifies the business feedback information as illegal.

In some implementations, the second designated operation can be used for enabling the apparatus to transfer a second set quantity of designated resources in the account address of the apparatus to the account address of the user included in the business request. In some implementations, the information generation module 504 can include a writing module. After the information generation module 504 determines that the consensus about the business feedback information is established by the block chain nodes in the consensus network 102, the writing module can write the business feedback information to the block chain of the apparatus.

In some implementations, the first block chain node 110a can send a business request generated according to business information sent by a user to a consensus network 102, such that when a second block chain node 110b in the consensus network 102 verifies a business result obtained by a third block chain node 110c in the consensus network 102 according to the business request as legal, the first block chain node 110a can be enabled to execute a first designated operation by using a first smart contract in the business request. The first block chain node 110a can utilize the smart contract that can be executed automatically, such that once the business result obtained by the third block chain node 110c according to the business request sent by the first block chain node 110a passes the verification carried out by the second block chain node 110b. The first block chain node 110a can execute the first designated operation by triggering the first smart contract, and the designated operation in the business processing procedure can be accomplished without manual intervention. The second block chain node 110b can verify the business result obtained by the third block chain node, such that the whole business processing procedure can be provided with a system of impartiality.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, that is, one or more modules of computer program instructions, encoded on non-transitory computer storage media for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple Compact Discs (CDs), Digital Video Discs (DVDs), magnetic disks, or other storage devices).

The operations described in this specification can be implemented as operations performed by a data processing apparatus on data stored on one or more computer-readable storage devices or received from other sources.

The terms "data processing apparatus," "computer," or "computing device" encompass all kinds of apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application specific integrated circuit (ASIC). The apparatus can also include, in addition to hardware, code that creates an execution environment for the computer program in question, for example, code that constitutes processor firmware, a protocol stack, a database management system, an operating system (for example, LINUX, UNIX, WINDOWS, MAC OS, ANDROID, IOS, another operating system, or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, software module, software unit, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile device, a personal digital assistant (PDA), a game console, a Global Positioning System (GPS) receiver, or a portable storage device (for example, a universal serial bus (USB) flash drive), to name just a few. Devices suitable for storing computer program instructions and data include all forms of non volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto optical disks; and CD ROM and DVD-ROM disks. The processor and the memory can be supplemented by, or incorporated in, special purpose logic circuitry.

Mobile devices can include mobile telephones (for example, smartphones), tablets, wearable devices (for example, smart watches, smart eyeglasses, smart fabric, smart jewelry), implanted devices within the human body (for example, biosensors, smart pacemakers, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors.

To provide for interaction with a user, embodiments of the subject matter described in this specification can be implemented on a computer having a display device, for example, a cathode ray tube (CRT) or liquid crystal display (LCD) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented using computing devices interconnected by any form or medium of wireline or wireless digital data communication (or combination thereof), for example, a communication network. Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Worldwide Interoperability for Microwave Access (WIMAX), Long Term Evolution (LTE), Code Division Multiple Access (CDMA), 5G protocols, IEEE 802.11 a/b/g/n or 802.20 protocols (or a combination of 802.11x and 802.20 or other protocols consistent with the present disclosure), Internet Protocol (IP), Frame Relay, Asynchronous Transfer Mode (ATM), ETHERNET, or other protocols or combinations of protocols. The communication network can transmit voice, video, data, or other information between the connected computing devices.

Embodiments of the subject matter described in this specification can be implemented using clients and servers interconnected by a communication network. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method comprising:
   receiving, by a first block chain node, business information sent by a user;
   generating a corresponding business request according to the business information, the business request comprising a first smart contract generated according to the business information; and
   sending the business request to a consensus network, wherein sending the business request to the consensus network comprises sending the business request comprising the first smart contract in a check pending state to the consensus network, wherein a third block chain node in the consensus network obtains a corresponding business result according to the business request and executes a first designated operation by triggering the first smart contract when it is determined that a second block chain node in the consensus network verifies the business result as legal.

2. The method of claim 1, wherein generating the first smart contract according to the business information comprises compiling the business information by using a preset solidity commandline (SOLC) compiler to obtain the first smart contract.

3. The method of claim 1, wherein generating the corresponding business request according to the business information comprises generating a business request comprising the first smart contract and an account address of the user according to the business information, and wherein the first designated operation is used for transferring a first set quantity of designated resources in the account address of the user to an account address of the third block chain node.

4. The method of claim 3, wherein after sending the business request to a consensus network, the method further comprises freezing the first set quantity of designated resources in the account address of the user by using the first smart contract when it is determined that the second block chain node verifies the business request as legal.

5. The method of claim 1, wherein after sending the business request to a consensus network, the method further comprises:
   receiving a query message, sent by the third block chain node, for processing the business request; and
   granting an access permission to the third block chain node when it is determined that the business request is processed by the third block chain node, wherein the third block chain node acquires the business information from the first block chain node and obtains the business result according to the business information.

6. The method of claim 1, wherein sending the business request to a consensus network comprises sending the business request to block chain nodes in the consensus network to establish a consensus, and wherein the method further comprises writing the business request into a block chain of the first block chain node after it is determined that the block chain nodes in the consensus network establish a consensus about the business request.

7. The method of claim 1, further comprising acquiring the business result from the third block chain node or the second block chain node when it is determined that the second block chain node verifies the business result as legal.

8. The method of claim 1, further comprising:
   acquiring, by the second block chain node from the consensus network, business feedback information sent by a third block chain node;
   acquiring a business result from the third block chain node according to the business feedback information, the business result being generated by the third block chain node according to a business request sent by a first block chain node to the consensus network; and
   when the business result is verified as legal, enabling the first block chain node to execute a first designated operation by triggering a first smart contract.

9. The method of claim 8, wherein enabling the first block chain node to execute a first designated operation by triggering a first smart contract comprises executing a signature on the business feedback information, wherein the signature is used for enabling a second smart contract included in the business feedback information to change its own state from a verification pending state to a verification successful state, the second smart contract is obtained by the third block chain node according to the business request, and the second smart contract in the verification successful state is used for enabling the second smart contract to trigger the first block chain node to execute the first designated operation by using the first smart contract.

10. The method of claim 8, further comprising instructing block chain nodes in the consensus network to establish a consensus about the business feedback information when the business result is verified as legal and writing the business feedback information into a block chain of the second block chain node when it is determined that the consensus about the business feedback information is established.

11. The method of claim 10, further comprising refusing to sign the business feedback information when the business result is verified as illegal, wherein the refusing to sign is used for enabling the third block chain node to execute a second designated operation by triggering the second smart contract.

12. The method of claim 8, wherein before acquiring, by a second block chain node from a consensus network, business feedback information sent by a third block chain node, the method further comprises:
acquiring a business request sent by the first block chain node to the consensus network, the business request comprising a first smart contract in a check pending state;
acquiring, according to the business request, business information corresponding to the business request from the first block chain node;
verifying whether the business information is legal;
upon determining that the business information is legal, signing on the business request to trigger the first smart contract to change from the check pending state to an acceptance pending state, the first smart contract in the acceptance pending state being used for enabling the first block chain node to freeze a first set quantity of designated resources in an account address of a user by using the first smart contract; and
upon determining that the business information is not legal, refusing to sign the business request, wherein the first block chain node determines that the business request is failed to be accepted.

13. The method of claim 12, further comprising instructing the block chain nodes in the consensus network to establish a consensus about the business request when the business information is verified as legal, and writing the business request into a block chain of the second block chain node after it is determined that the consensus about the business request is established.

14. The method of claim 8, further comprising:
acquiring, by the third block chain node, a business request sent by the first block chain node by using the consensus network, the business request comprising a first smart contract generated by the first block chain node according to business information sent by a user;
obtaining a business result and business feedback information according to the business request; and
sending the business feedback information to the consensus network, wherein a second block chain node in the consensus network acquires the business result from the third block chain node according to the business feedback information, and when the business result is verified as legal, the first block chain node is enabled to execute a first designated operation by triggering the first smart contract.

15. The method of claim 14, wherein acquiring, by a third block chain node, the business request sent by a first block chain node by using a consensus network comprises gaining a business request comprising a first smart contract in an acceptance pending state.

16. The method of claim 14, wherein the first designated operation is used for enabling the first block chain node to transfer a first set quantity of designated resources in an account address of the user included in the business request to an account address of the third block chain node, and wherein obtaining a business result according to the business request comprises:
obtaining a second smart contract and the business result according to the business request; and
obtaining business feedback information according to the business request including generating, according to the business result, the business feedback information comprising the second smart contract, abstract information of the business result, and the account address of the third block chain node.

17. The method of claim 16, wherein obtaining the second smart contract according to the business request comprises:
determining a business level and a business type of the business request; and
determining the second smart contract according to the business level, the business type, and the first smart contract.

18. A non-transitory, computer-readable medium storing one or more instructions executable by a computer system to perform operations comprising: receiving, by a first block chain node, business information sent by a user; generating a corresponding business request according to the business information, the business request comprising a first smart contract generated according to the business information; and
sending the business request to a consensus network, wherein sending the business request to the consensus network comprises sending the business request comprising the first smart contract in a check pending state to the consensus network, wherein a third block chain node in the consensus network obtains a corresponding business result according to the business request and executes a first designated operation by triggering the first smart contract when it is determined that a second block chain node in the consensus network verifies the business result as legal.

19. A computer-implemented system, comprising: one or more computers; and
one or more computer memory devices interoperably coupled with the one or more computers and having tangible, non-transitory, machine-readable media storing one or more instructions that, when executed by the one or more computers, perform one or more operations comprising:
receiving, by a first block chain node, business information sent by a user;
generating a corresponding business request according to the business information, the business request comprising a first smart contract generated according to the business information; and
sending the business request to a consensus network, wherein sending the business request to the consensus network comprises sending the business request comprising the first smart contract in a check pending state to the consensus network, wherein a third block chain node in the consensus network obtains a corresponding business result according to the business request and executes a first designated operation by triggering the first smart contract when it is determined that a second block chain node in the consensus network verifies the business result as legal.

* * * * *

UNITED STATES PATENT AND TRADEMARK OFFICE
CERTIFICATE OF CORRECTION

PATENT NO. : 10,796,379 B2  
APPLICATION NO. : 15/900647  
DATED : October 6, 2020  
INVENTOR(S) : Ning Li Page 1 of 1

It is certified that error appears in the above-identified patent and that said Letters Patent is hereby corrected as shown below:

On the Title Page

Item (56) - under References cited, delete "70,244,761" and insert -- 2017/0244761 A1 --, therefor.

In the Claims

Column 30/Line 5 - In Claim 18, delete "Anon-transitory," and insert -- A non-transitory, --, therefor.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*